(12) United States Patent
Norton et al.

(10) Patent No.: US 7,664,027 B2
(45) Date of Patent: Feb. 16, 2010

(54) INFRARED ADAPTER WITH DATA PACKET THROTTLE

(75) Inventors: Daniel A. Norton, Austin, TX (US); Glenn Reinhardt, Austin, TX (US)

(73) Assignee: SigmaTel, Inc., Austin, TX (US)

( * ) Notice: Subject to any disclaimer, the term of this patent is extended or adjusted under 35 U.S.C. 154(b) by 896 days.

(21) Appl. No.: 10/969,498

(22) Filed: Oct. 20, 2004

(65) Prior Publication Data

US 2006/0083164 A1 Apr. 20, 2006

(51) Int. Cl.
*H04J 1/16* (2006.01)
*H04L 12/26* (2006.01)

(52) U.S. Cl. ...................................... 370/232
(58) Field of Classification Search ........................ None
See application file for complete search history.

(56) References Cited

U.S. PATENT DOCUMENTS

| | | | |
|---|---|---|---|
| 5,781,177 A * | 7/1998 | Helot et al. | 345/156 |
| 6,255,800 B1 * | 7/2001 | Bork | 320/115 |
| 6,393,032 B1 | 5/2002 | Ikegami | |
| 6,501,576 B1 | 12/2002 | Seacombe | |
| 7,106,101 B2 | 9/2006 | Palmer et al. | |
| 7,333,432 B1 * | 2/2008 | Mor et al. | 370/230.1 |
| 2001/0015842 A1 | 8/2001 | Patel et al. | |
| 2002/0176138 A1 | 11/2002 | Schlanger | |
| 2003/0016697 A1 | 1/2003 | Jordan | |
| 2004/0097199 A1 | 5/2004 | Kawamura et al. | |
| 2004/0153890 A1 * | 8/2004 | Davis et al. | 714/699 |
| 2004/0184722 A1 | 9/2004 | Schilling | |

FOREIGN PATENT DOCUMENTS

| | | |
|---|---|---|
| EP | 0 665 502 A1 | 12/1994 |
| EP | 1069512 A2 | 1/2001 |
| JP | 10056411 A | 2/1998 |
| JP | 2003044188 A | 2/2003 |

* cited by examiner

*Primary Examiner*—William Trost, IV
*Assistant Examiner*—Raj Jain
(74) *Attorney, Agent, or Firm*—Toler Law Group

(57) ABSTRACT

A method for controlling data packet flow through an infrared adapter is provided and includes receiving a data stream from an infrared device. The data stream has a first data transmission rate. Further, the rate of transmission of the data stream is modified within the infrared adapter to produce an output data stream having a second data transmission rate. Also, the output data stream is transmitted from the infrared adapter. In a particular embodiment, the first data transmission rate is different from the second data transmission rate. Particularly, the second data transmission rate is less than the first data transmission rate.

26 Claims, 3 Drawing Sheets

INFRARED ADAPTER WITH DATA PACKET THROTTLE

FIELD OF THE DISCLOSURE

The present disclosure relates generally to infrared devices.

BACKGROUND

Some computers are not equipped with infrared (IR) transceivers for sending and receiving data via IR connections. However, many computer peripheral devices are equipped with IR transceivers that can be used to establish IR connections with other devices having IR transceivers. As such, IR adapters have been provided that can be connected to a computer in order for the computer to establish IR connections with peripheral devices having IR capabilities.

Unfortunately, some computer operating systems are unable to handle data from an IR adapter with a transmission rate of above a threshold transmission rate.

Accordingly, there is a need for an enhanced IR adapter.

DETAILED DESCRIPTION OF THE DRAWING(S)

A method for controlling data packet flow through an infrared adapter is provided- and includes receiving a data stream from an infrared device. The data stream has a first data transmission rate. Further, the rate of transmission of the data stream is modified within the infrared adapter to produce an output data stream having a second data transmission rate. Also, the output data stream is transmitted from the infrared adapter. In a particular embodiment, the first data transmission rate is different from the second data transmission rate. Particularly, the second data transmission rate is less than the first data transmission rate.

Further, in a particular embodiment, the output data stream is transmitted to a computer. The computer can be a desktop computer, a laptop computer, or a handheld computer. Also, in a particular embodiment, the infrared adapter is integral to the computer, but it can also be removably coupled to the computer. The infrared device can be a printer, a scanner, an external memory, a computer, a cellular telephone, an MP3 player, a portable digital assistant, a digital camera, a remote control device, a facsimile machine, and a network connection device.

In a particular embodiment, the method further includes determining an operating system of a computer. Also, a determination is made in order to ascertain whether the operating system is within a predetermined class of suspect operating systems. Additionally, after determining that the operating system is within the predetermined class of suspect operating systems, a delay value for modifying the first data transmission rate is determined. Particularly, the first data transmission rate is delayed at least partially based on the delay value.

In another embodiment, an infrared adapter is provided and includes a controller. A program is embedded within the controller and includes instructions to modify a rate of transmission of an infrared data stream received at the infrared adapter.

In yet another embodiment, a computer system is provided and includes a computer and an infrared adapter that is coupled to the computer. In a particular embodiment, the infrared adapter includes an input to receive an incoming data stream that has a first rate of transmission. The infrared adapter also includes an output to communicate an outgoing data stream with a second rate of transmission. Particularly, the first rate of transmission is different from the second rate of transmission.

Figure 1:
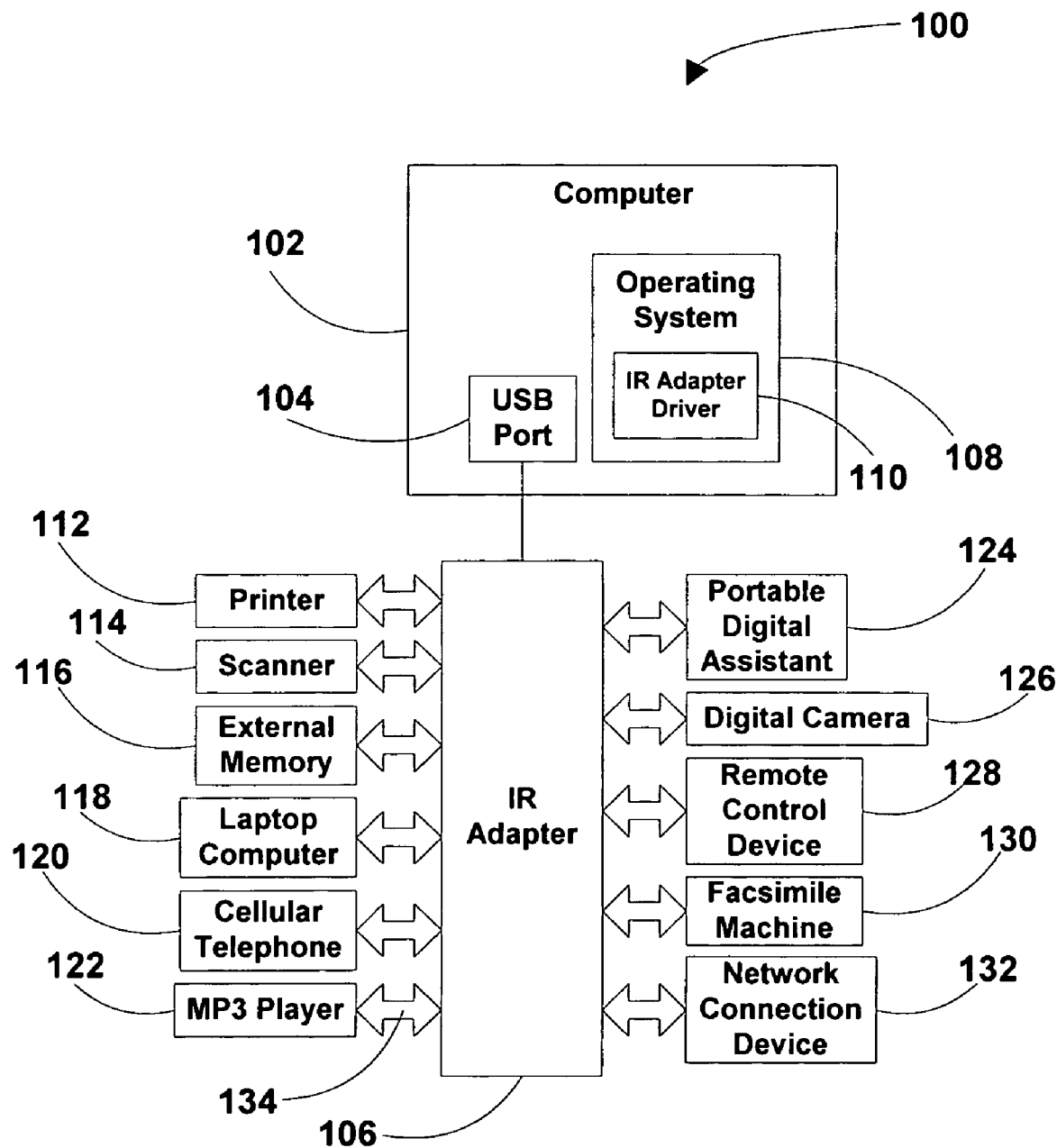
FIG. 1 is a block diagram of a computer system and an infrared adapter.

FIG. 1 shows an exemplary, non-limiting embodiment of a computing system, designated 100. As illustrated in FIG. 1, the computing system 100 includes a computer 102 having at least one universal serial bus (USB) port 104. In a particular embodiment, the computer 102 is a desktop computer, a laptop computer, or a handheld computer. Further, in a particular embodiment, an infrared (IR) adapter 106 can be removably connected to the computer 102 via the USB port 104. Alternatively, the IR adapter 106 can be integrally formed with the computer 102, e.g., the IR adapter 106 can be integrally formed using a circuit card that is semi-permanently installed in the computer 102.

As further shown in FIG. 1, the computing system 100 includes an operating system 108 and an IR adapter driver 110 that is embedded or otherwise installed in the operating system 108. In an illustrative embodiment, the IR adapter driver 110 includes one or more instructions for controlling the operation of the IR adapter 106. FIG. 1 also shows that the computer system 100 includes many IR devices that can communicate with the computer 102 via the IR adapter 106. As depicted in FIG. 1, the IR devices can include a printer 112, a scanner 114, an external memory 116, a computer 118, a cellular telephone 120, an MP3 player 122, a portable digital assistant 124, a digital camera 126, a remote control device 128, a facsimile machine 130, a network connection device 132, or other IR device. In a particular embodiment, the computer 118 is a desktop computer, a laptop computer, or a handheld computer. Further, in a particular embodiment, the network connection device 132 is an analog modem, a digital broadband modem, a router, a gateway, or a switch.

Each of the IR devices 112, 114, 116, 118, 120, 122, 124, 126, 128, 130, 132 can include an IR output port that can transmit an IR data stream 134 that can be received by the IR adapter 106 and selectively processed to alter the transmission rate of the data packets that compose the IR data stream 134.

Figure 2:
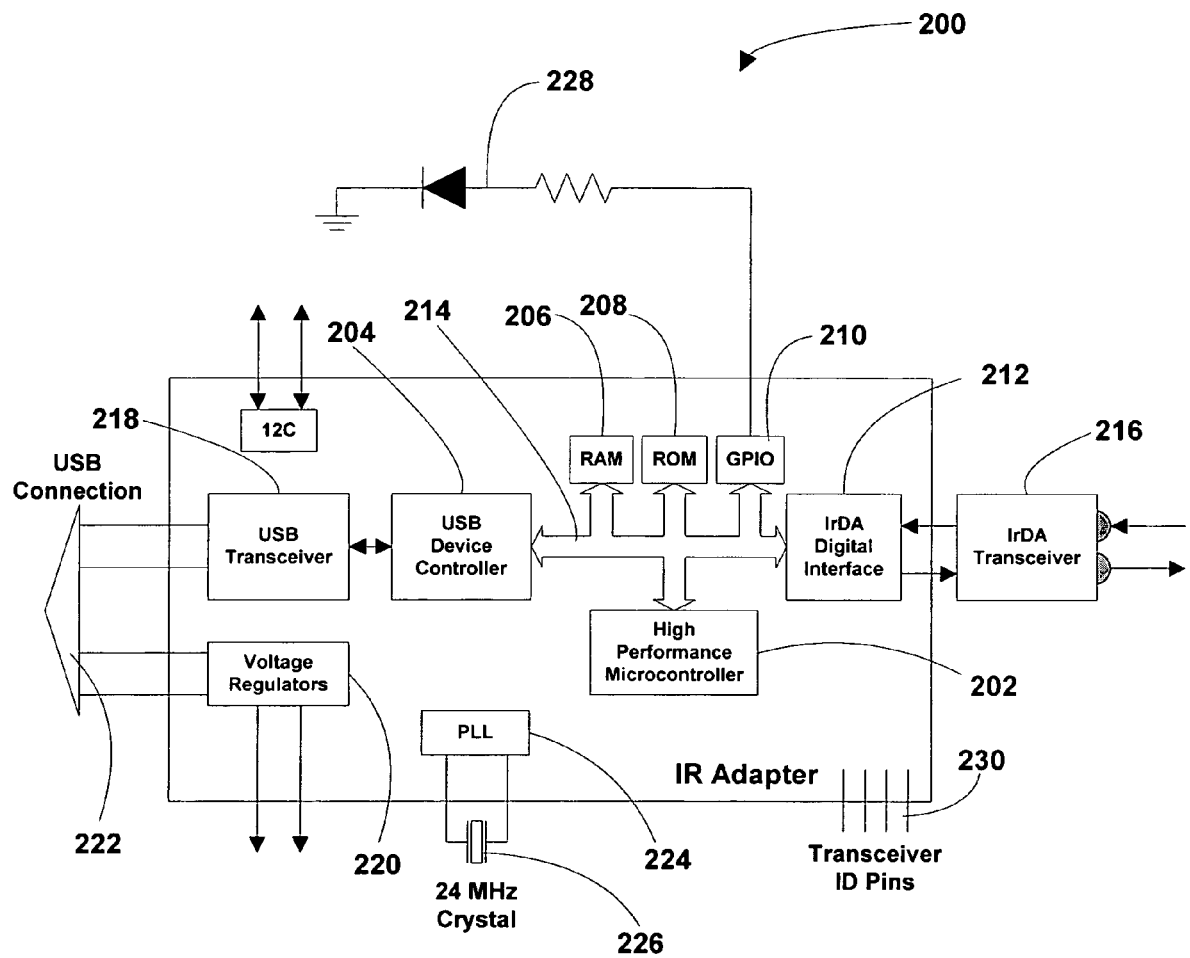
FIG. 2 is a block diagram of an infrared adapter.

Referring to FIG. 2, an exemplary, non-limiting embodiment of an IR adapter is shown and is generally designated 200. As shown, the IR adapter 200 includes a high performance microcontroller 202, a universal serial bus (USB) high-speed device controller 204, a random access memory (RAM) device 206, a read-only memory (ROM) device 208, one or more general purpose input/output (GPIO) pins 210, and a digital interface 212 that, in a particular embodiment, conforms to the infrared data association (IrDA) protocol. In a particular embodiment, the high-performance microcontroller 202, the USB high-speed device controller 204, the RAM device 206, the ROM device 208, the GPIO pins 210, and the IrDA digital interface 212 are interconnected via a connection bus 214. As further illustrated in FIG. 2, an IrDA compliant transceiver 216 is connected to the IrDA compliant digital interface 212. Further, the high-performance microcontroller 202 can include a program for throttling data packets received by the IR adapter 200.

FIG. 2 further depicts a USB high-speed transceiver 218 that is connected to the USB high-speed device controller 204. As shown in FIG. 2, the IR adapter 200 includes a voltage regulator 220. Moreover, a USB cable 222 can be connected to the USB high-speed transceiver 218 and the voltage regulator 220. In a particular embodiment, the voltage regulator 220 regulates the voltage to the USB cable 222 to 3.3 volts or 1.8 volts. FIG. 2 also shows that the IR adapter 200 includes a phase locked loop (PLL) 224 that generates on-chip clocks from a crystal 226, e.g., a 24 MHz crystal. Further, the IR adapter 200 includes an activity light emitting diode (LED) 228 that can indicate activity at the IR adapter, e.g., when information is being transmitted through the IR adapter 200. Additionally, as shown the IR adapter 200 can include a plurality of transceiver ID pins 230.

Figure 3:
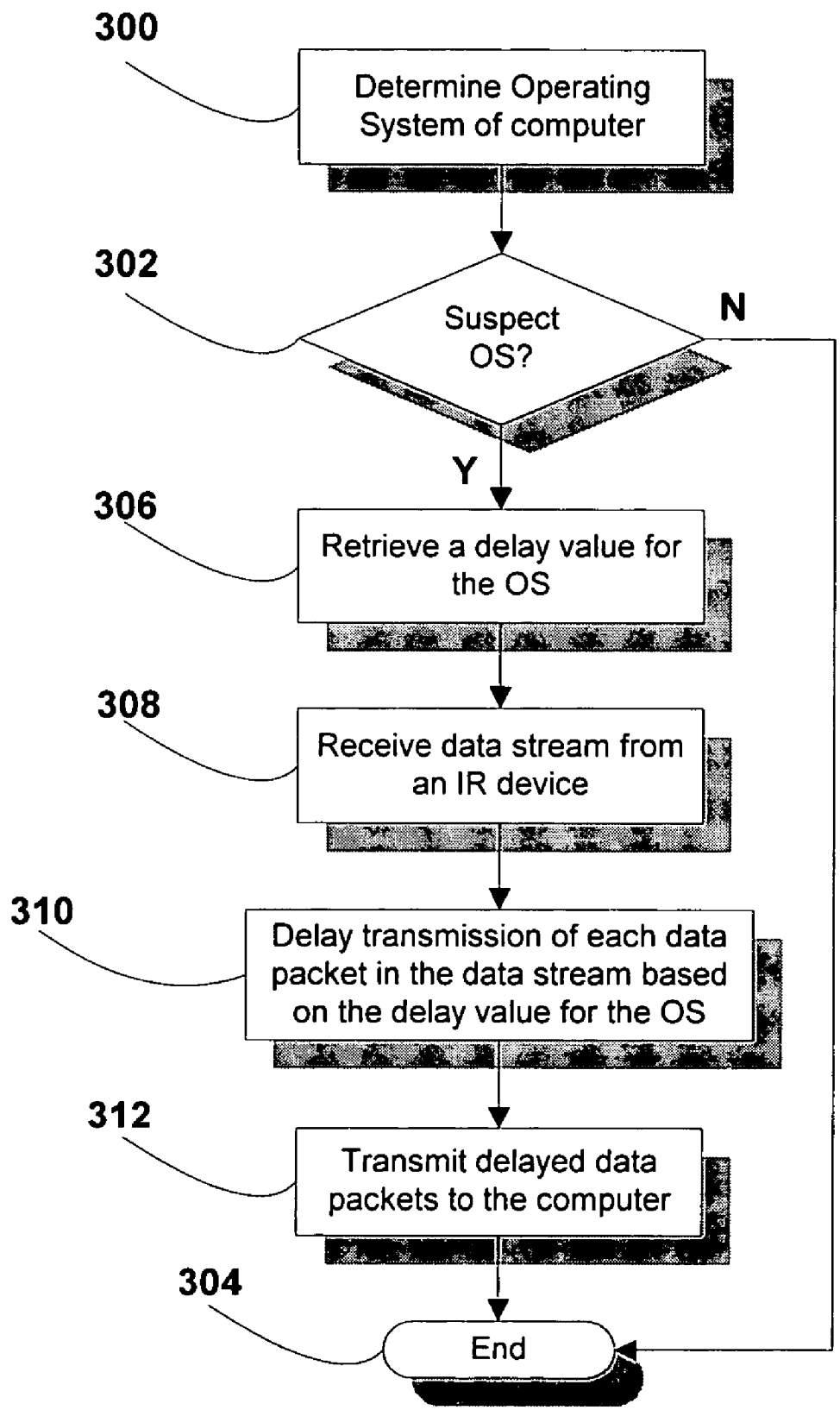
FIG. 3 is a flow chart illustrating a method for throttling data packets received from an infrared adapter.

Referring now to FIG. 3, an exemplary, non-limiting embodiment of a method for throttling data packets received at an IR adapter, e.g., the IR adapter shown in FIG. 1 and FIG. 2, is shown and commences at block 300. At block 300, the operating system of the computer is determined, e.g., by the IR adapter driver 110 (FIG. 1) that is installed within the OS 108 (FIG. 1) of the computer 102 (FIG. 1). Thereafter, at decision step 302, a decision is made in order to ascertain whether the OS 108 (FIG. 1) of the computer 102 (FIG. 1) is in a class of suspect OSs, i.e., OSs that cannot handle data packets that are transmitted to the OS (FIG. 1) above a certain data transmission rate threshold. Microsoft Windows 98 is an example of a suspect OS.

At decision step 302, if the OS 108 (FIG. 1) is not designated as a suspect OS, the logic ends at state 304. On the other hand, if the OS 108 (FIG. 1) is a suspect OS, the logic proceeds to block 306 and a delay value for the OS 108 (FIG. 1) is retrieved from a database of delay values for the suspect OSs. Moving to block 308, a data stream is received from an IR device, e.g., one of the IR devices shown in FIG. 1. At block 310, the transmission of each data packet in the data stream is delayed based on the delay value for the OS. In a particular embodiment, the transmission of each data packet in the data stream is delayed by approximately 1700 microseconds. Thus, the rate of transmission of a data stream output by the IR adapter is less than the rate of transmission of a data stream input to the IR adapter.

In a particular embodiment, data packets that are input to the IR adapter 106 (FIG. 1) can be buffered, e.g., in the RAM device 206, and then, transmitted from the RAM device 206 at a rate that includes the delay value. Proceeding to block 312, data packets from the IR device that have been delayed are transmitted to the computer 102 (FIG. 1) so they will not cause any problems at the computer. The logic then ends at state 304.

With the configuration of structure described above, the IR adapter with data packet throttle as disclosed herein provides a means for lowering a data transmission rate from an IR device, such that an operating system within a computer can process a data stream received at the lower data transmission rate. Thus, the computer system errors due to a data transmission rate that is too fast are significantly reduced.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method for controlling data packet flow through an infrared adapter, the method comprising:
    receiving a data stream from an infrared device, the data stream having a first data transmission rate;
    determining that an operating system of a computer to receive an output data stream is one of a predetermined class of suspect operating systems, wherein a suspect operating system is an operating system that can not handle data packets that are transmitted at a data rate above a data transmission rate threshold;
    determining a delay value for the operating system from a database of delay values associated with the suspect operating systems;
    modifying a rate of transmission of the data stream of the infrared adapter to produce the output data stream having a second data transmission rate, wherein the second data transmission rate is at least partially based on the operating system, wherein the transmission of each data packet in the data stream is delayed based on the delay value for the operating system;
    transmitting the output data stream from the infrared adapter; and
    wherein the first data transmission rate is different from the second data transmission rate.

2. The method of claim 1, wherein the second data transmission rate is less than the first data transmission rate.

3. The method of claim 1, wherein the output data stream is transmitted to the computer.

4. The method of claim 3, wherein the computer is a desktop computer, a laptop computer, or a handheld computer.

5. The method of claim 3, wherein the infrared adapter is integral to the computer.

6. The method of claim 3, wherein the infrared adapter is removably coupled to the computer.

7. The method of claim 1, wherein the infrared device is selected from the group consisting of a printer, a scanner, an external memory, a personal computer, a cellular telephone, an MP3 player, a portable digital assistant, a digital camera, a remote control device, a facsimile machine, and a network connection device.

8. A method for controlling data packet flow through an infrared adapter, the method comprising:
    receiving a data stream from an infrared device, the data stream having a first data transmission rate;
    determining an operating system of a computer to receive an output data stream;
    modifying a rate of transmission of the data stream of the infrared adapter to produce the output data stream at a second data transmission rate, wherein the second data transmission rate is at least partially based on the operating system;
    wherein the first data transmission rate is different from the second data transmission rate;
    determining whether the operating system is within a predetermined class of suspect operating systems, wherein a suspect operating system is an operating system that can not handle data packets that are transmitted at a data rate above a data transmission rate threshold;
    after determining that the operating system is within the predetermined class of suspect operating systems, determining, from a database of delay values for the suspect operating systems, a delay value for modifying the first data transmission rate, wherein the transmission of each data packet in the data stream is delayed based on the delay value for the operating system; and transmitting the output data stream from the infrared adapter.

9. The method of claim 8, wherein the first data transmission rate is delayed at least partially based on the delay value.

10. An infrared adapter, comprising:
a controller configured to modify a rate of transmission of an infrared data stream received at the infrared adapter; wherein the modified rate of transmission is at least partially based on a delay value of a type of operating system of a computer that receives an output data stream, the delay value obtained from a data base of delay values for suspect operating systems, wherein a suspect operating system is an operating system that can not handle data packets that are transmitted at a data rate above a data transmission rate threshold, and wherein transmission of each data packet in the infrared data stream is delayed based on the delay value.

11. The infrared adapter of claim 10, wherein the controller is configured to output the output data stream from the infrared adapter.

12. The infrared adapter of claim 11, wherein the output data stream output by the infrared adapter is communicated to the computer.

13. The infrared adapter of claim 12, wherein the computer is a desktop computer, a laptop computer, or a handheld computer.

14. The infrared adapter of claim 10, wherein the infrared data stream received at the infrared adapter is received from an infrared device.

15. The infrared adapter of claim 14, wherein the infrared device is selected from the group consisting of a printer, a scanner, an external memory, a personal computer, a cellular telephone, an MP3 player, a portable digital assistant, a digital camera, a remote control device, a facsimile machine, and a network connection device.

16. A computer system, comprising:
a computer having an operating system;
an infrared adapter coupled to the computer, the infrared adapter including:
an input to receive an incoming infrared data stream with a first rate of transmission;
an output to communicate an outgoing data stream with a second rate of transmission, wherein the first rate of transmission is different from the second rate of transmission; and
wherein the second rate of transmission is at least partially based on a type of the operating system such that the operating system has an associated delay value obtained from a database of delay values for suspect operating systems, wherein a suspect operating system is an operating system that can not handle data packets that are transmitted at a data rate above a data transmission rate threshold, and wherein the second rate of transmission is slower than the first rate of transmission, wherein the transmission of each data packet in the data stream is delayed based on the delay value.

17. The computer system of claim 16, wherein the computer includes a data port and the infrared adapter is removably connected to the data port.

18. The computer system of claim 17, wherein the infrared data port is integrally formed with the computer.

19. The computer system of claim 16, wherein the computer is a desktop computer, a laptop computer, or a handheld computer.

20. The computer system of claim 16, wherein the infrared adapter includes an infrared transceiver for receiving the incoming data stream.

21. The computer system of claim 20, wherein the infrared transceiver conforms to an infrared data association (IrDA) protocol.

22. The computer system of claim 16, wherein the infrared adapter includes a universal serial bus port for outputting the outgoing data stream.

23. The computer system of claim 16, wherein the infrared adapter includes a voltage regulator connected to the universal serial bus port.

24. The computer system of claim 16, wherein the infrared adapter further comprises a controller to determine when the type of operating system is included in a database of predetermined types of operating systems.

25. A computer system, comprising:
a computer having an operating system;
an infrared adapter coupled to the computer, the infrared adapter including an input to receive an incoming infrared data stream with a first rate of transmission;
an output to communicate an outgoing data stream with a second rate of transmission, wherein the first rate of transmission is different from the second rate of transmission;
wherein the second rate of transmission is at least partially based on a type of the operating system;
a controller to determine when the type of operating system is included in a database of predetermined types of operating systems;
wherein the database of predetermined types of operating systems includes operating systems that can not handle data packets that are transmitted at a data rate above a data transmission rate threshold; and
wherein the controller retrieves a delay value from a database of delay values, wherein the delay value is based on the type of operating system, wherein the transmission of each data packet in the data stream is delayed based on the delay value.

26. The computer system of claim 25, wherein the second rate of transmission is at least partially modified based on the delay value.

* * * * *